(12) United States Patent
Smaini et al.

(10) Patent No.: US 9,825,668 B2
(45) Date of Patent: Nov. 21, 2017

(54) DEVICES AND METHODS FOR POWER CONSUMPTION CONTROL IN POWERLINE COMMUNICATIONS SYSTEMS AND APPARATUS

(71) Applicant: Maxlinear Asia Singapore PTE LTD, Singapore (SG)

(72) Inventors: Lydi Smaini, Savigny (CH); Alexandre Rouxel, Divonne les Bains (FR)

(73) Assignee: MAXLINEAR ASIA SINGAPORE PRIVATE LIMITED, Singapore (SG)

( * ) Notice: Subject to any disclaimer, the term of this patent is extended or adjusted under 35 U.S.C. 154(b) by 0 days.

(21) Appl. No.: 15/220,773

(22) Filed: Jul. 27, 2016

(65) Prior Publication Data

US 2016/0336999 A1   Nov. 17, 2016

Related U.S. Application Data

(63) Continuation of application No. 14/154,023, filed on Jan. 13, 2014, now Pat. No. 9,407,323.

(60) Provisional application No. 61/754,349, filed on Jan. 18, 2013.

(51) Int. Cl.
*H04B 3/54* (2006.01)
*H04B 3/56* (2006.01)

(52) U.S. Cl.
CPC .............. *H04B 3/54* (2013.01); *H04B 3/542* (2013.01); *H04B 3/56* (2013.01); *H04B 2203/5416* (2013.01); *H04B 2203/5425* (2013.01); *H04B 2203/5454* (2013.01); *H04B 2203/5483* (2013.01); *H04B 2203/5491* (2013.01); *H04B 2203/5495* (2013.01)

(58) Field of Classification Search
CPC ............ H04B 1/109; H04B 2203/5491; H04B 2203/5495; H04B 2203/5425; H04B 3/54
USPC .............................................. 307/3
See application file for complete search history.

(56) References Cited

U.S. PATENT DOCUMENTS 9,407,323 B2 *   8/2016   Smaini ..................... H04B 3/54

OTHER PUBLICATIONS

HomePlug AV White Paper, HomePlug Powerline Alliance, Document version No. HPAVWP-050818, 2005, 11 pages.
HomePlug, http://en.wikipedia.org/wiki/HomePlug, downloaded Apr. 12, 2012, 6 pages.
G.hn, http://en.wikipedia.org/wiki/G.hn, downloaded Mar. 28, 2012, 12 pages.
Marvell—Wireline Networking—G.hn Transceiver—Powerline Wall Plug, http://www.marvell.com/wireline-networking/ghn/hardware, downloaded Dec. 6, 2013, 2 pages.

(Continued)

*Primary Examiner* — Robert DeBeradinis
(74) *Attorney, Agent, or Firm* — McAndrews, Held & Malloy, Ltd.

(57) ABSTRACT

The present disclosure includes systems and techniques relating to power line communications (PLC) systems and apparatus. In some implementations, a method includes determining information regarding a potential data rate to be used with a powerline communications (PLC) channel, reducing a bias current or voltage of an analog front end of a PLC transceiver based on the determined information to reduce power consumption of the analog front end of the PLC transceiver, and transmitting or receiving data over the PLC channel with the reduced bias current or voltage of the analog front end of the PLC transceiver.

20 Claims, 8 Drawing Sheets

(56) References Cited

OTHER PUBLICATIONS

Marvell G.hn GE-DW360F Powerline Wall-Plug, http://www.marvell.com/wireline-networking/ghn/assets/Marvell_G.hn_GE_DW360F_Wallplug, downloaded Dec. 6, 2013, 2 pages.
Part 1 of 7, IEEE Standard for Broadband over Power Line Networks: Medium Access Control and Physical Layer Specifications, IEEE Std 1901-2010, 250 pages.
Part 2 of 7, IEEE Standard for Broadband over Power Line Networks: Medium Access Control and Physical Layer Specifications, IEEE Std 1901-2010, pp. 205-454.
Part 3 of 7, IEEE Standard for Broadband over Power Line Networks: Medium Access Control and Physical Layer Specifications, IEEE Std 1901-2010, pp. 455-704.
Part 4 of 7, IEEE Standard for Broadband over Power Line Networks: Medium Access Control and Physical Layer Specifications, IEEE Std 1901-2010, pp. 705-954.
Part 5 of 7, IEEE Standard for Broadband over Power Line Networks: Medium Access Control and Physical Layer Specifications, IEEE Std 1901-2010, pp. 955-1204.
Part 6 of 7, IEEE Standard for Broadband over Power Line Networks: Medium Access Control and Physical Layer Specifications, IEEE Std 1901-2010, pp. 1205-1403.
Part 7 of 7, IEEE Standard for Broadband over Power Line Networks: Medium Access Control and Physical Layer Specifications, IEEE Std 1901-2010, pp. 1404-1540.
http://www.ti.com/lit/ds/symlink/afe031.pdf, Texas Instrument: "Powerline communication Analogue Front-End AFE031", May 18, 2012, pp. 1-50.
Authorized officer Brigitte Bettiol, Notification of Transmittal of the International Search Report and the Written Opinion of the International Searching Authority, International Application No. PCT/IB2014/000036, dated May 15, 2014, 9 pages.

* cited by examiner

DEVICES AND METHODS FOR POWER CONSUMPTION CONTROL IN POWERLINE COMMUNICATIONS SYSTEMS AND APPARATUS

CROSS REFERENCE TO RELATED APPLICATIONS

This disclosure claims the benefit of the priority of U.S. Provisional Application Ser. No. 61/754,349, filed Jan. 18, 2013 and entitled "Powerline Communications Analog Front-End Power Consumption Control as a Function of the Channel Conditions and the Data-Rate", which is hereby incorporated by reference in its entirety.

BACKGROUND

The present disclosure describes systems and techniques relating to power line communications (PLC) systems and apparatus.

The IEEE (Institute of Electrical and Electronics Engineers) Standard 1901-2010 has been proposed for broadband communications over power line networks. IEEE Std. 1901™-2010 describes Media Access Control (MAC) and Physical Layer (PRY) specifications to provide a flexible architecture supporting integrated access, Smart Grid, building, in-home, and transportation platforms (vehicle) applications. This standard includes description of transmit power control (TPC) to support regulatory requirements and to reduce interference with external communications technologies and with other basic service sets (BSSs) on the same power lines. The TPC service provides, in part, adaptation of transmit power based on a range of information, including path loss and link margin estimates.

Other standards include ITU-T (International Telecommunication Union's Telecommunication standardization sector) G.hn, HPAV (HomePlug AV), and HPAV2. In typical implementations of the broadband PLC standards, the analog front end (AFE) is dimensioned to pass several hundreds of Mbits/s, e.g., using 4096 QAM (Quadrature Amplitude Modulation), which typically requires at least 40 db SNDR (Signal to Noise and Distortion Ratio) using BW (bandwidth) of greater than 50 MHz or less for HPAV. In other words, prior PLC AFEs are specified and designed for supporting the maximum performance of the system in terms of data rate.

SUMMARY

The present disclosure includes systems and techniques relating to power line communications (PLC) systems and apparatus. The design of an analog front end (AFE) for PLC systems and apparatus is generally a trade-off between power consumption and performance in terms of linearity and noise figure so as to achieve the highest data rates. But in most actual deployed environments the maximum data rate cannot be reached most of the time due to the noise or interferers found, given the powerline channel conditions that are actually present. The systems and techniques described in the present disclosure take account of this reality for actual deployment environments.

According to an aspect of the described systems and techniques, a method includes determining information regarding a potential data rate to be used with a powerline communications (PLC) channel, reducing a bias current or voltage of an analog front end of a PLC transceiver based on the determined information to reduce power consumption of the analog front end of the PLC transceiver, and transmitting or receiving data (e.g., at the potential data rate) over the PLC channel with the reduced bias current or voltage of the analog front end of the PLC transceiver. The method can also include determining additional information regarding a new potential data rate to be used with the PLC channel, boosting the bias current or voltage of the analog front end of the PLC transceiver based on the additional information to increase power consumption of the analog front end of the PLC transceiver, and transmitting or receiving data (e.g., at the new potential data rate) over the PLC channel with the boosted bias current or voltage of the analog front end of the PLC transceiver.

Determining the information regarding the potential data rate can include determining a channel condition of the PLC channel, determining a data rate required by an application or a network, or both. Determining the information regarding the potential data rate can include determining a channel condition of the PLC channel based on received information regarding a transmitter output power. Determining the information regarding the potential data rate can include determining a channel condition of the PLC channel based on received information regarding impedance matching with the powerline. Determining the information regarding the potential data rate can include computing a data rate achievable on the PLC channel as a function of bias current and signal to noise ratio (SNR) measured on the PLC channel with a given bias and voltage.

The method can include setting the power consumption of the analog front end such that noise and distortion caused by the analog front end are adapted to noise from the PLC channel. The method can include computing the noise from the PLC channel as a function of a measured signal to noise ratio (SNR). The method can include computing the noise from the PLC channel as a function of tonemap and coding rate. The method can include setting the power consumption of the analog front end such that noise and distortion caused by the analog front end are adapted to a target noise required to reach a given data rate. The method can include determining the given data rate from a link data rate required by an application.

According to another aspect of the described systems and techniques, a system includes a power line, and a transceiver including an analog front end coupled with the power line, wherein the transceiver is configured to determine information regarding a potential data rate to be used with powerline communications (PLC) over the power line, reduce a bias current or voltage of the analog front end based on the determined information to reduce power consumption of the analog front end, and transmit or receive data over the power line with the reduced bias current or voltage of the analog front end. The transceiver can also be configured to perform additional operations of the methods noted above.

According to another aspect of the described systems and techniques, a device includes an analog front end configured to support powerline communications (PLC), and a baseband processor coupled with the analog front end and configured to operate the PLC, wherein the baseband processor is further configured to adapt power consumption of the analog front end as a function of powerline channel conditions.

The baseband processor can be configured to adapt the power consumption of the analog front end as a function of both the powerline channel conditions and a desired data rate. The baseband processor can be configured to adapt the power consumption of the analog front end by modifying a bias current in the analog front end. The baseband processor can be configured to modify bias currents in both a transmit chain and a receive chain in the analog front end.

The baseband processor can be configured to adapt transmit power consumption versus path linearity as a function of a transmitter output power. The baseband processor can be configured to adapt transmit power consumption versus path linearity as a function of impedance matching with the powerline. The baseband processor can be configured to set the power consumption of the analog front end such that noise and distortion caused by the analog front end are adapted to noise from the powerline channel. The baseband processor can be configured to set the power consumption of the analog front end such that noise and distortion caused by the analog front end are adapted to a target noise required to reach a given data rate.

According to another aspect of the described systems and techniques, a wall plug modem includes a powerline inlet and a powerline outlet, an analog front end coupled with the powerline inlet, a digital signal processor (DSP) coupled with the analog front end and configured to operate powerline communications (PLC) via the analog front end and the powerline inlet, and a local area network transceiver coupled with the DSP, wherein the DSP is further configured to adapt power consumption of the analog front end as a function of powerline channel conditions. In addition, the DSP can be configured to adapt the power consumption of the analog front end as a function of both the powerline channel conditions and a desired data rate.

The described systems and techniques can be implemented in electronic circuitry, computer hardware, firmware, software, or in combinations of them, such as the structural means disclosed in this specification and structural equivalents thereof. This can include at least one computer-readable medium embodying a program operable to cause one or more data processing apparatus (e.g., a signal processing device including a programmable processor) to perform method operations. Thus, program implementations can be realized from a disclosed method, system, or apparatus, and apparatus implementations can be realized from a disclosed system, computer-readable medium, or method. Similarly, method implementations can be realized from a disclosed system, computer-readable medium, or apparatus, and system implementations can be realized from a disclosed method, computer-readable medium, or apparatus.

The described systems and techniques can result in a PLC transceiver that can achieve high data rates under ideal conditions, but also conserves power under less than ideal conditions. The PLC channel can be checked, and the power consumption of the analog front end (AFE) can be adjusted based on actual channel characteristics. The signal to noise ratio (SNR) of the link can be determined (or known in advance), and if the link can support a high data rate, the power consumption of the AFE can be maximized to achieve the highest data rate. On the other hand, if the link cannot support such a high data rate due to a low SNR, the power consumption of the AFE can be decreased. This decreases the performance of the AFE, but need not decrease the data rate because the link is the limiting factor in such situations.

In addition, in some implementations, the power consumption of the AFE can be decreased even when the quality of the channel supports the highest data rates, such as when the current communication needs do not require a high data rate. This can result in further power savings, which can add significant value to devices that employ these system and techniques. For example, in a wall plug modem implementation, the reduction in power usage can cause a noticeable reduction in heat generated by the wall plug, which can be an easily communicated selling point for typical consumers. Moreover, meeting consumer demand for lower energy to reduce power consumption and cost can also lead to increased reliability of the device.

Details of one or more implementations are set forth in the accompanying drawings and the description below. Other features and advantages may be apparent from the description and drawings, and from the claims.

DRAWING DESCRIPTIONS

Like reference symbols in the various drawings indicate like elements.

DETAILED DESCRIPTION

Figure 1A:
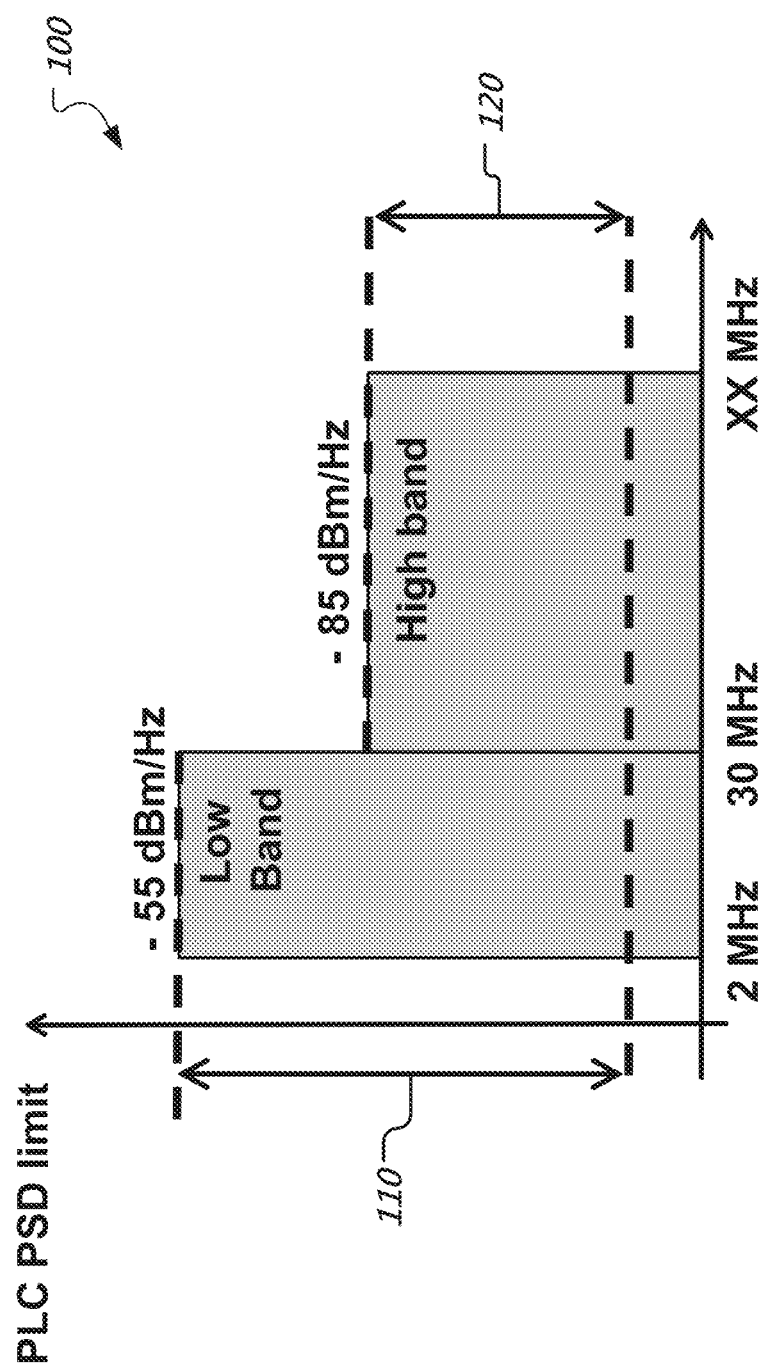
FIG. 1A shows an example of power spectral density (PSD) limitation in a power line communications (PLC) system.

FIG. 1A shows an example of power spectral density (PSD) limitation 100 in a power line communications (PLC) system. In general, the PSD relates to the power carried per unit frequency of the signal. The PLC PSD limits are represented by the y axis of the graph, and the frequencies of the communications signals are represented by the x axis on the graph (e.g., 2-30 MHz for the low band, and 30-XX MHz for the high band). In order to achieve the maximum data rate (e.g., to map 4096 QAM modulation on all the subcarriers) with maximum coding rate (e.g., R=16/18 for the IEEE 1901 standard) one should guarantee SNDR>40 dB in the whole band, as represented at 120, which shows the PLC PSD that should be obtained as compared with −85 dBm/Hz (where dBm is the power ratio in decibels) over a base noise level in the high band region. In addition, one should guarantee SNDR>70 dB in the low band region, as represented at 110, which shows the PLC PSD that should be obtained as compared with −55 dBm/Hz over a base noise level in the low band region. As shown in FIG. 1A, the high band (above 30 MHz) has a step of 30 dB compared to the low band (under 30 MHz). In order to achieve the desired SNDR in the high and low band, in a PLC device in view of the target powerline spectrum, the analog frontend (AFT) should be designed with high linearity for the transmitter (Tx) and very low noise for receiver (Rx).

Figure 1B:
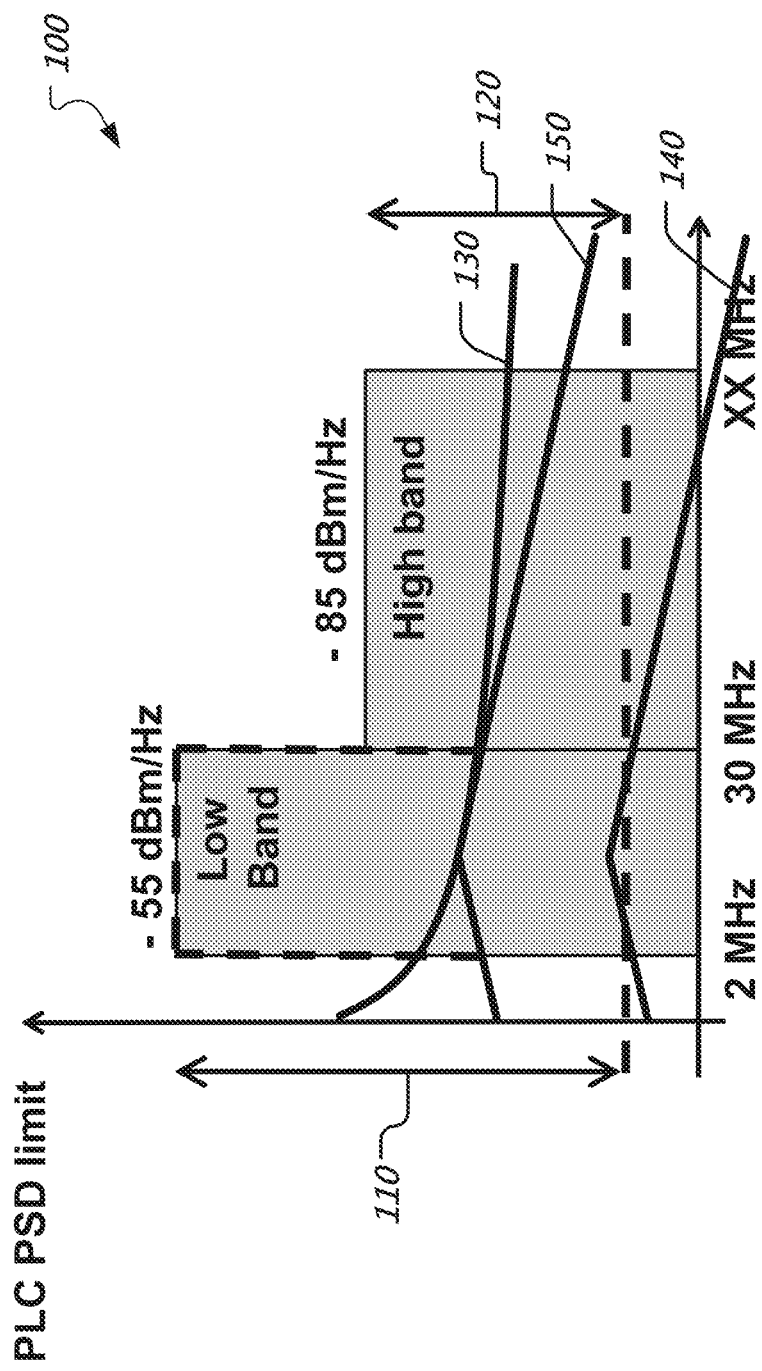
FIG. 1B shows an example of transmission linearity versus powerline noise level in a PLC system.

FIG. 1B shows an example of transmission linearity versus powerline noise level in a PLC system. In transmission, the performance is limited by the linearity (e.g., of the AFE) causing leakage of the low band into the high band and then limiting the SNDR, This can be quantified by the MTPR (Multi Tone Power Ratio) (e.g., a measure of the ratio of the power in spectral notches to the power of the frequency components of a signal). As shown in FIG. 1B, the performance is limited at 130 by the powerline noise level. In view of this, the Tx linearity can be adjusted from a first position 140 (for a high performance mode) to a second position 150 (for a low power Tx mode).

High data rate PLC (e.g., over 200 Mb/s) consumes a good deal of power, in part because the AFE needs to be engineered to support the high data rate. However, as shown in FIG. 1B, in many sit lions, a PLC device is connected with a channel that cannot achieve the highest specified data rate (e.g., 100-200 Mb/s are commonly achieved data rates in typical PLC installations). By detecting conditions when the highest data e cannot be achieved (or is not needed) the power consumption of the AFE during transmission can be reduced to save power in the device. Note that the power consumption during transmission being addressed here is completely separate from the transmit power. Even though the transmit power may also be adjusted, the power savings of adjusting the power consumption of the AFE can be achieved even while holding the transmit power constant.

Reducing the power consumption of the AFE during transmission degrades the transmitted signal SNDR. But when the link quality is bad on the power line, the transmission degradation cause by lowering the power consumption of the AFE can be made negligible as compared with the noise on the link itself, e.g., ten percent (or less) of the degradation caused b the link itself. Thus, substantial power savings u more than ten percent be achieved with insubstantial loss of transmission quality ten percent or less). Likewise, when the link quality is good (e.g., close transceivers on either end, and lop/noise for the channel) the Tx linearity can be set back to the maximum quality 140, with the corresponding increase in power consumption, in order to achieve the high performance data rates.

Figure 1C:
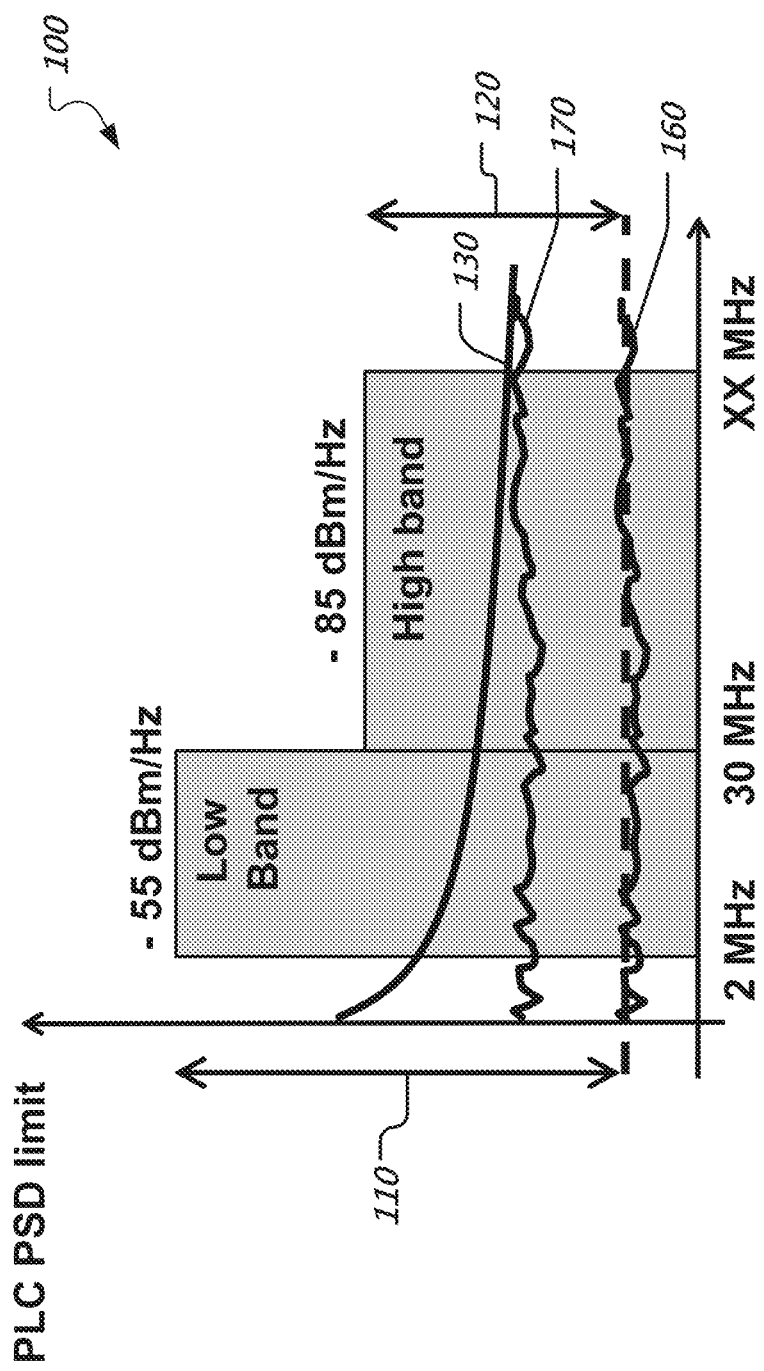
FIG. 1C shows an example of reception noise floor versus powerline noise level in a PLC system.

FIG. 1C shows an example of reception noise floor versus powerline line noise level in a PLC system. In reception, the performance is limited by the noise level (or figure) within the high band. Although linearity also has an impact, this impact is typically low since the received signal level is often low. Thus, the noise figure typically has the most impact, but the noise figure is also dependent on the power consumption of the AFE, and thus the same issue is at play. If the SNR is good for the channel, the power consumption of the AFE can be increased to provide a good noise figure (e.g., a noise factor that is comparable to the low noise in the whole band), as shown at 160 (noise floor in the high performance mode). If the SNR is not so good for the channel, the power consumption of the AFE can be correspondingly decreased, as shown at 170 (noise floor in the low power Rx mode).

Figure 2:
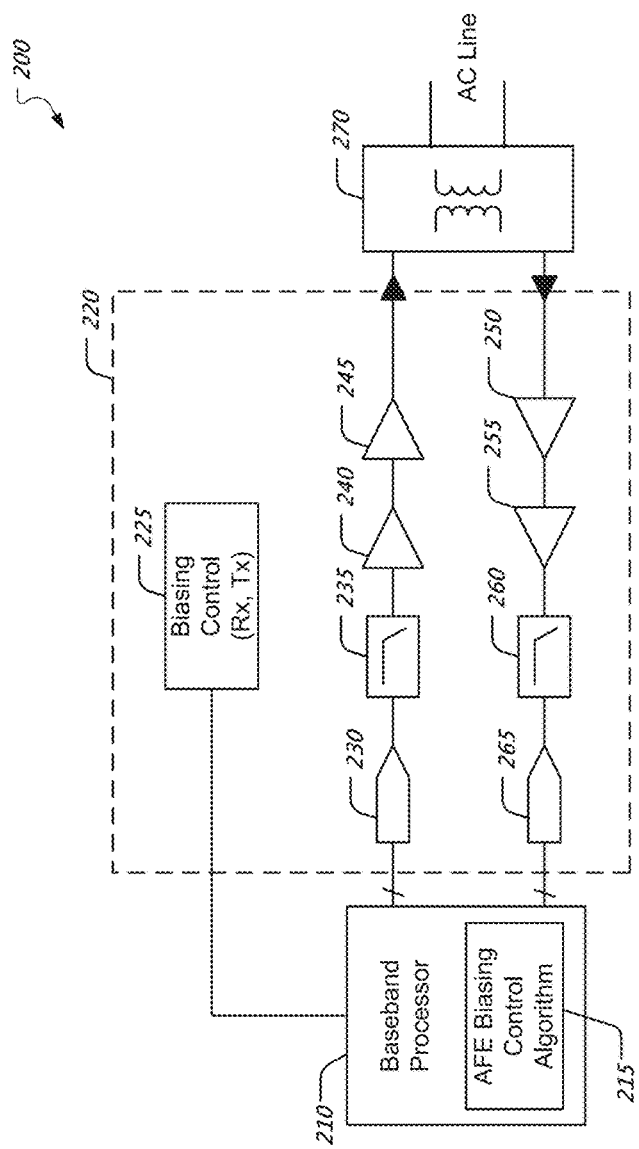
FIG. 2 shows an example of a PLC apparatus that adapts power consumption of an analog front end (AFE) based on powerline channel conditions, a desired data rate, or both.

FIG. 2 shows an example of a PLC apparatus 200 that adapts power consumption of an analog front end (AFE) based on powerline channel conditions, a desired data rate, or both. The PLC apparatus 200 includes a baseband processor 210 and an AFE 220, where the AFE 220 includes both a transmit chain and a receive chain. In addition, the PLC apparatus 200 can also include a coupler 270 to connect the PLC apparatus 200 with an AC (Alternating Current) line for PLC.

The baseband processor 210 and the AFE 220 can be implemented on a single integrated circuit (IC) chip or on more than one IC chip. In some implementations, two chips are used: a first digital baseband chip 210, which is built with advanced silicon, and a second chip for the AFE 220, which is built with older technology silicon to achieve high performance and linearity. In any case, the baseband processor 210 can be configured to adjust the power consumption of the AFE 220 independent of any change in the transmit power being used for transmission. Note that "power consumption" is distinct from "transmit power".

The baseband processor 210 includes structures that implement the functionality described herein, which is represented as AFE biasing control algorithm 215. This can include implementations that are entirely in hardware, as well as implementations that include a combination of hardware and code (e.g., a firmware or software program encoded in an appropriate non-transitory medium). The AFE biasing control algorithm 215 can cause the baseband processor 210 to control the power consumption of the AFE 220 based on the channel conditions. For example, the noise of the AFE can be matched with that of the channel at hand. This can be done by adjusting the biasing of the AFE 220.

In some implementations, the AFE 220 includes biasing control 225, which can be connected with the baseband processor 210 through a Serial Peripheral Interface (SPI) or other type of interface. The baseband processor 210 can communicate with the biasing control 225 to change bias levels in both the transmit chain and the receive chain. This can involve changing one or more bias currents, voltages, or both, which results in lower SNR quality, but the resulting SNR is still better than the SNR of the link. Thus, separate from any modulation of generated power, adjusting the power consumption of the transmit chain degrades the linearity of the AFE 220 transmitter, resulting in more noise seen at the receiver on the other end of the channel. Likewise, adjusting the power consumption of the receive chain degrades the noise figure of the ATE 220 receiver, resulting in more noise in the received signal. But this added noise (either from transmission, reception, or both) is still dominated by the channel.

The SNR of the channel can be estimated by a procedure in the AFE biasing control algorithm 215. For example, a traditional sounding procedure (or a more advanced method performing sounding directly on transmitted data) can be used initially at the maximum power consumption level (i.e., highest quality setting for the AFE 220). This can be done cyclically to analyze the newly started link and determine the link quality for the channel and estimate the SNR. This measurement of the noise on the channel can then be combined with built in knowledge of the degradation/noise caused by reduction of the power consumption of the AFE 220 (i.e., based on the AFE design) to tune the noise created by AFE 220 to be more than that of the highest quality setting, but still negligible compared with the noise of the channel.

In some cases, the transmitter in a PLC system won't know the actual SNR, but rather will determine the number of bits per carrier, from which the SNR can be deduced. So the data rate achieved can be used to determine an estimate of the SNR. On the other hand, the receiver in a PLC system will typically know the SNR statistics and can use them directly. Moreover, in some implementations, the transmit power can also be adjusted based on the channel at hand, and the power consumption of the AFE 220 can be adjusted based on the adjusted transmit power. In any case, the power consumption of the AFE 220 can be optimized for the actual channel and link currently available.

The transmit chain can include a digital to analog converter (DAC) 230, a reconstruction filter 235, PGA (programmable gain amplifier) Tx 240, and a line driver 245.

The receive chain can include a low noise amplifier (LNA) 250, PGA Rx 255, an anti-alias filter 260, and an analog to digital converter (ADC) 265. In some implementations, the baseband processor 210 uses the biasing control 225 to drive all the biases of the line driver 245 on the transmitter side and all the biases of the LNA 250 on the receiver side. In some implementations, all the bias levels for both transmission and reception can be set based on measured SNR (e.g., using the sounding procedure, as noted above).

In some implementations, the DAC 230 is not part of the AFE 220, but rather is coupled directly with the baseband processor 210 or incorporated into the baseband processor 210. Likewise, in some implementations, the ADC 265 is part of the AFE 220, but rather is coupled directly with the baseband processor 210 or incorporated into the baseband processor 210.

The PLC apparatus 200 can be integrated into a larger PLC device or system. For example, the PLC apparatus 200 can be integrated into a wall plug modem, which can include a G.hn-compliant MAC/PHY transceiver, a Gigabit PHY, and a built-in pass-through power socket. Other PLC communication systems, including those implementing PLC standard(s), can employ PLC apparatus as described herein. For example, in automotive applications, PLC devices are used to control light emitting diodes (LEDs).

Figure 3:
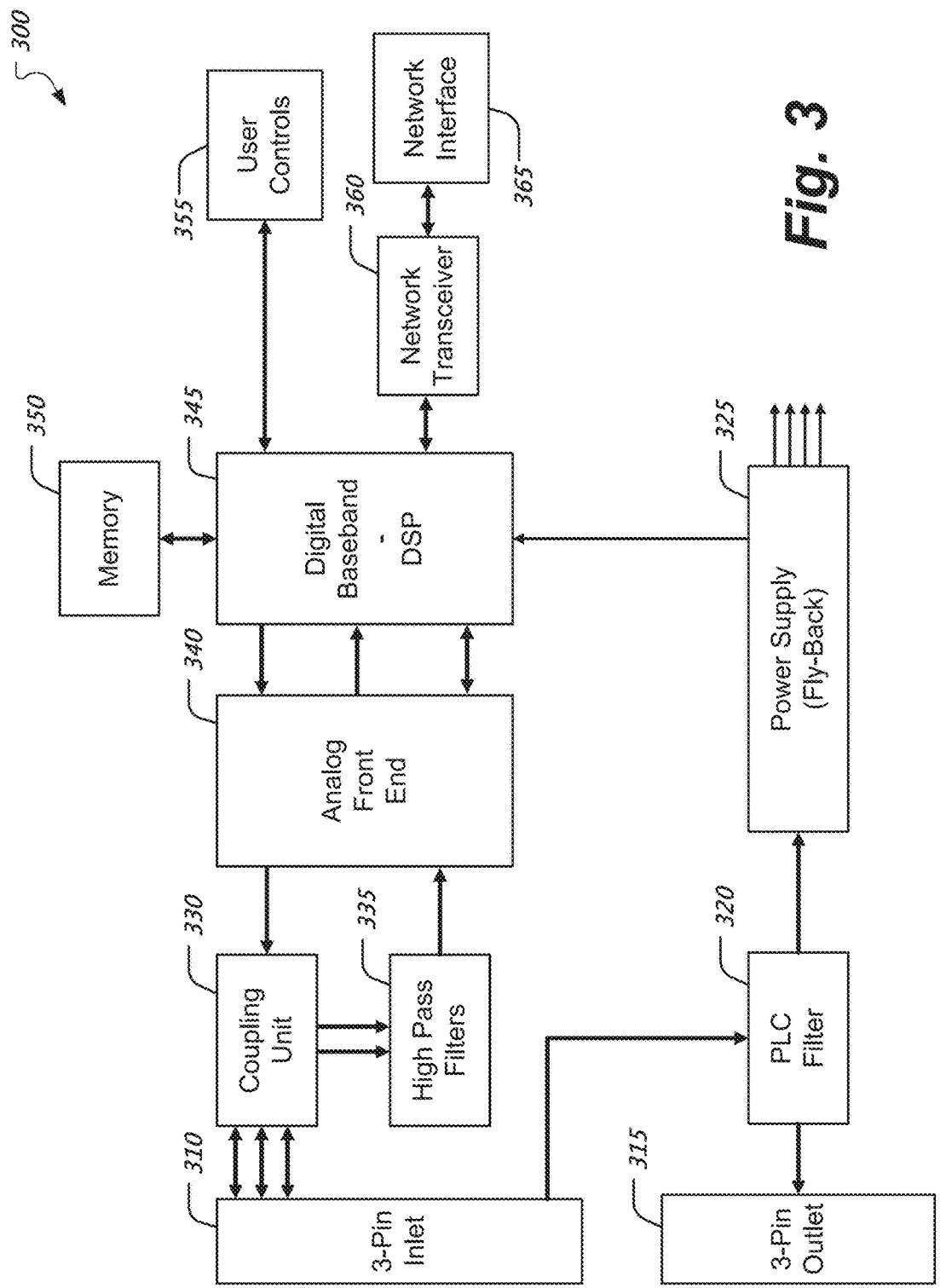
FIG. 3 shows an example of a PLC system that adapts power consumption of an AFE based on powerline channel conditions, a desired data rate, or both.

FIG. 3 shows an example of a PLC system 300 (e.g., a wall plug modem) that adapts power consumption of an AFT based on powerline channel conditions, a desired data rate, or both. The system 300 includes a 3-pin inlet 310, a 3-pin outlet 315, a PLC filter 320, and a power supply (fly-back) 325. For PLC functions, the system 300 includes a coupling unit 330, one or more high pass filters 335, an AFT 340, and a baseband digital signal processor (DSP) 345. The DSP 345 can be configured to adapt the power consumption of the AFE 340, such as described elsewhere in this disclosure.

The system 300 can include one or more memories 350, such as a Flash memory and a double data rate (DDR) memory (e.g., a DDR2 memory). The system can include user controls 355 (e.g., LEDs and buttons), a network transceiver 360, and a network interface 365. For example, the network transceiver 360 can be a Gigabit Ethernet transceiver, and the network interface 365 can be an Ethernet interface that includes multiple ports and magnetics.

Figure 4:
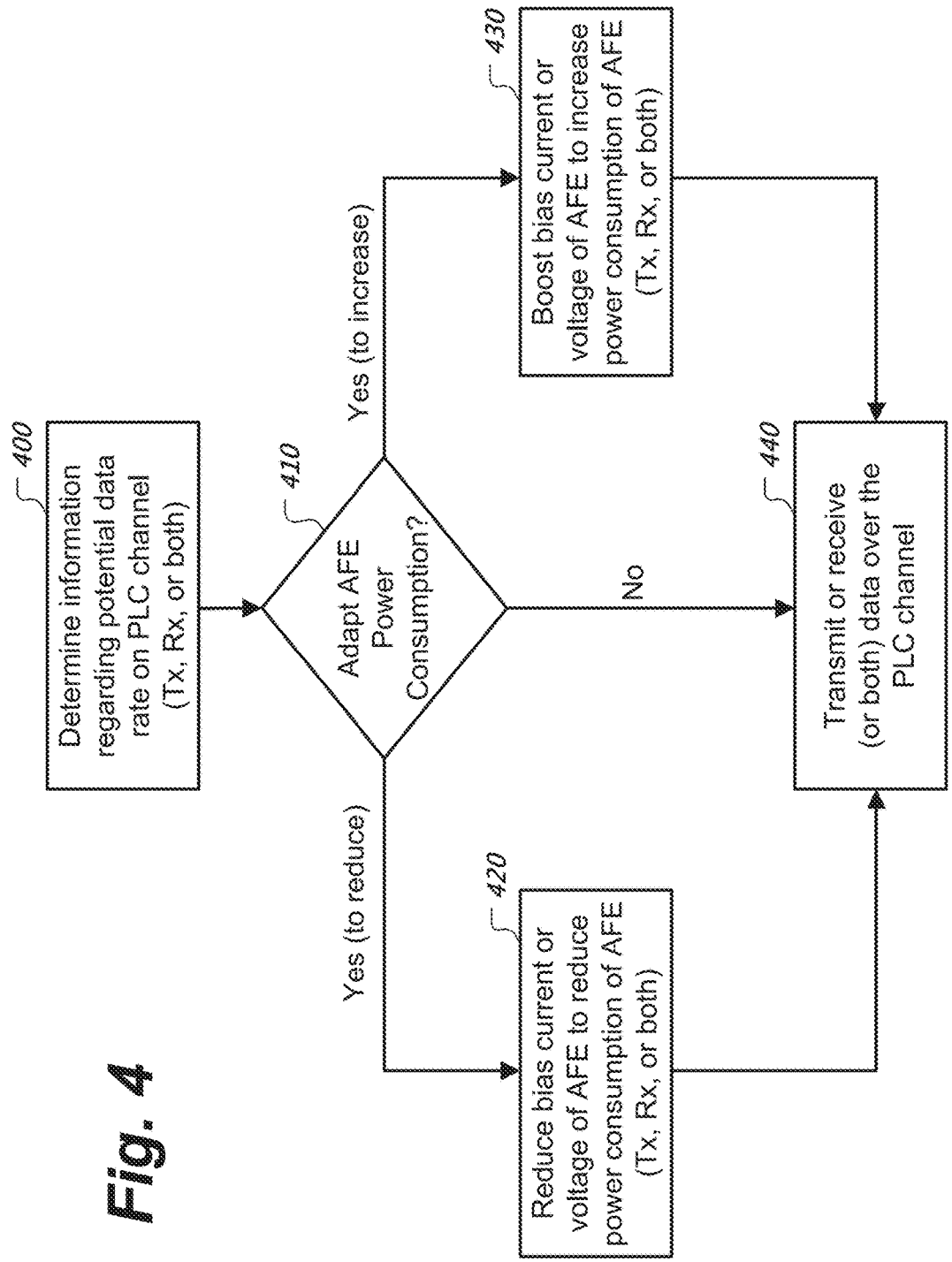
FIG. 4 is a flowchart showing an example of a process of adapting the power consumption of an AFE based on powerline channel conditions, a desired data rate, or both, which can be performed by a transceiver (Tx+Rx).

FIG. 4 is a flowchart showing an example of a process of adapting the power consumption of an AFE based on powerline channel conditions, a desired data rate, or both, which can be performed by a transceiver (Tx+Rx). At 400, information regarding a potential data rate to be used with a powerline communications (PLC) channel is determined. This can be done for transmission, reception, or both. In addition, the potential data e can be determined in accordance with a channel condition of the PLC channel, a data rate required by an application or network, or both.

At 410, a check is made to determine whether the power consumption of the AFE should be adapted in view of the determined data rate. For example, the AFE power consumption can be actively adapted as a function of the powerline channel conditions (noise level, interferers, etc.) and/or data rate. When a decision is made to reduce the power consumption C the channel conditions are had due to low SNDR and only low data rates are achievable), the AFT bias current or voltage is reduced at 420. Again, this can be done for transmission, reception, or both. When a decision is made to increase the power consumption (e.g., the channel conditions are good due to high SNDR and high data rates are achievable), the AFE bias current or voltage is boosted at 430. Once again, this can be done for transmission, reception, or both.

At 440, data is transmitted, received, or both over the PLC channel. The process of FIG. 4 can then repeat, as desired (e.g., periodically or with each newly established link). Moreover, as noted above, the adaption of the power consumption of the AFE can be based on a desired data rate as well. Thus, the AFE bias current or voltage can also be boosted at 430 and/or reduced at 420 as a function of the data rate required by the application or network. The data rate loss in such cases, due to the additional noise bias current, is acceptable because the data rate required (e.g., by a given application) is met. In fact, there can be a threshold effect, where the noise due to the bias current may not be negligible, but the final data rate is identical because of the data rate specified for the application or network.

Figure 5:
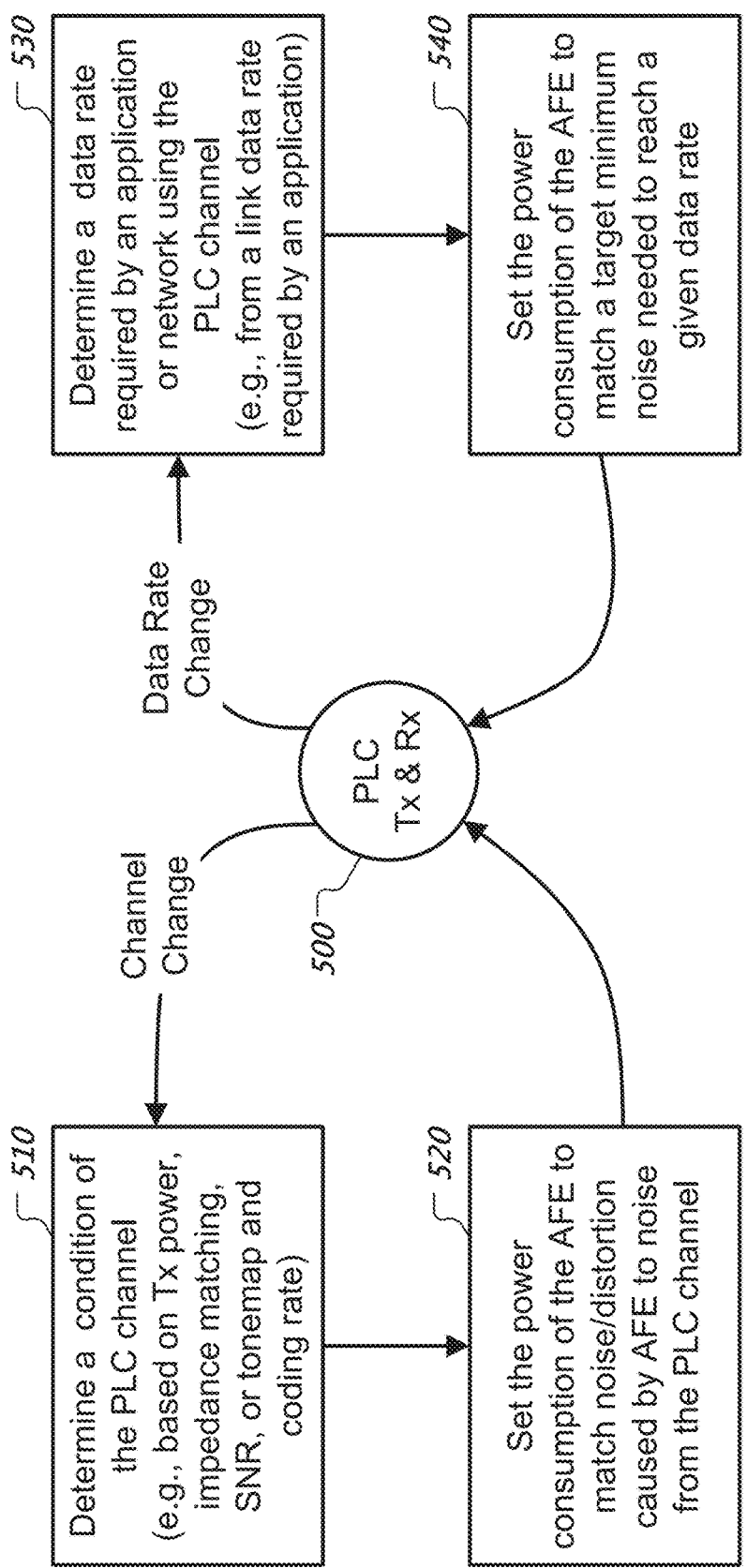
FIG. 5 is a flowchart showing various examples of processes of adapting the power consumption of an AFE based on powerline channel conditions and an indicated data rate, which can be performed by a transceiver (Tx+Rx).

FIG. 5 is a flowchart showing various examples of processes of adapting the power consumption of an AFE based on powerline channel conditions and an indicated data rate, which can be performed by a transceiver (Tx+Rx). At 500, PLC operations can be performed, including transmission and reception. When a change in the channel is detected, a condition of the PLC channel can be determined at 510. For transmission, this can involve determining a channel condition of the PLC channel based on received information regarding a transmitter output power, determining a channel condition of the PLC channel based on received information regarding impedance matching with the powerline, or both. For transmission and/or reception, this can involve computing the noise from the PLC channel as a function of a measured SNR, computing the noise from the PLC channel as a function of tonemap and coding rate, or both. In some implementations, a data rate achievable on the PLC channel can be computed as a function of bias current and SNR measured on the PLC channel with a given bias and voltage.

At 520, the power consumption of the AFT can be set to match the noise/distortion caused bt the AFE to the noise from the PLC channel. For example, the power consumption of the analog front end can be set such that noise and distortion caused b the analog front end are negligible compared to noise from the PLC channel. In some implementations, the Tx power consumption versus path linearity can be adapted as a function of the transmitter output power. In some implementations, the Tx power consumption versus path linearity can be adapted as a function of the impedance mat g with the powerline.

In some implementations, the Rx and/or Tx power consumption can be adapted as a function of the tonemap and coding rate, given by the channel conditions and Tx/Rx noise and distortions. In some implementations, the Rx and/or Tx power consumption can be computed as a function of a measured SNR or tonemap and coding rate.

When a change in the data rate is detected, a date rate required by an application or network using the PLC channel can be determined at 530. For example, a given data rate to be achieved can be determined from a link data rate required by an application. At 540, the power consumption of the AFE can be set to match a target minimum noise needed to reach a given data rate. In some implementations, the Rx and/or Tx power consumption can be adapted as a function of the link data rate required by the application. For example, the Rx and/or Tx power consumption can be set such that the AFE Tx/Rx noise and distortions are negligible compared to the target noise required to reach a given data rate.

Figure 6:
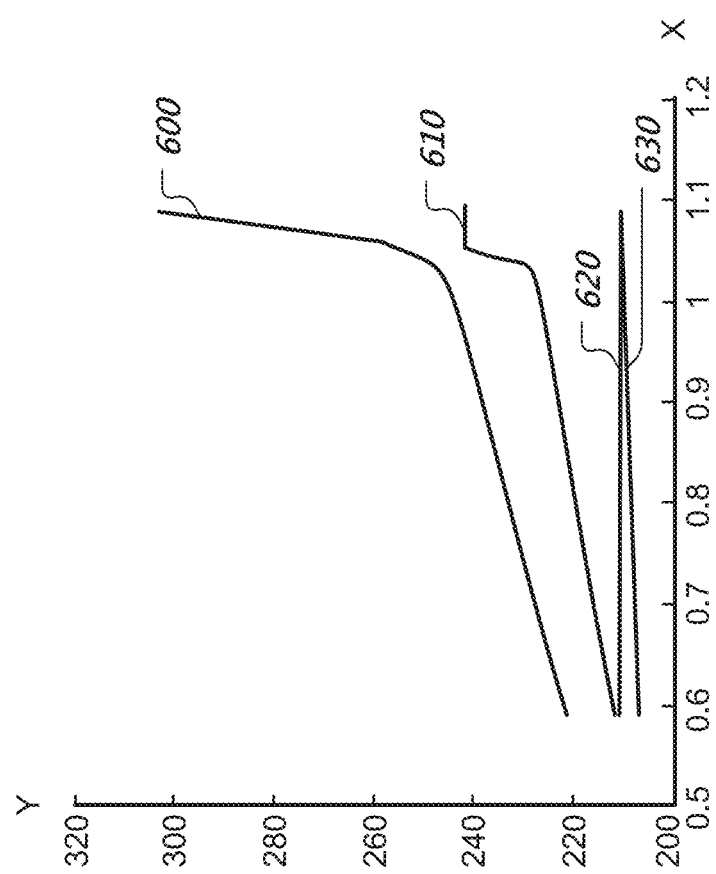
FIG. 6 is a graph showing examples of maximum PHY data rates as a function of power consumption of an AFE of a PLC system.

FIG. 6 is a graph showing examples of maximum PHY data rates as a function of power consumption of an AFE of a PLC system. The x axis of the graph shows Tx power consumption in Watts, and the y axis shows the PHY data rate in Mb/s. A plot 600 shows the reduction in data rate (as power consumption is reduced) for low band plus high band at a theoretical infinite SNR. A plot 610 shows the reduction in data rate (as power consumption is reduced) for low band plus high band at a more realistic SNR AWGN (Additive White Gaussian Noise) of 40 dB. A plot 620 shows the reduction in data rate (as power consumption is reduced) for only the low band at the SNR AWGN of 40 dB. A plot 630 shows the reduction in data rate as power consumption is reduced) for only the low band at the theoretical infinite SNR. Note that the Rx AFE current consumption can be readily decreased in order to adapt the noise due to the Rx AFE to the channel noise level. Also note that in the low band, the Tx noise contribution is negligible with an AWGN set to 40 dB, so the Tx power consumption can be set to minimum. As shown in FIG. 6, if the targeted data rate is less than 200 Mb/s, the Tx power consumption can readily be set to a minimum of 0.59 Watts.

A few embodiments have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof including potentially a program operable to cause one or more data processing apparatus to perform the operations described (such as a program encoded in a computer-readable medium, which can be a memory device, a storage device, a machine-readable storage substrate, or other physical, machine-readable medium, or a combination of one or more of them).

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

Other embodiments fall within the scope of the following claims.

What is claimed is:

1. A method comprising:
   determining information regarding a parameter to be used with a powerline communications (PLC) channel;
   adjusting a control parameter of an analog front end of a PLC transceiver based on the determined information to adjust power consumption of the analog front end of the PLC transceiver; and
   transmitting or receiving data over the PLC channel with the adjusted control parameter of the analog front end of the PLC transceiver.

2. The method of claim 1, comprising:
   determining additional information regarding the parameter to be used with the PLC channel;
   re-adjusting the control parameter of the analog front end of the PLC transceiver based on the additional information to re-adjust power consumption of the analog front end of the PLC transceiver; and
   transmitting or receiving data over the PLC channel with the re-adjusted control parameter of the analog front end of the PLC transceiver.

3. The method of claim 1, wherein determining the information regarding the parameter comprises:
   determining a channel condition of the PLC channel; and
   determining a related performance parameter required by an application or a network.

4. The method of claim 1, wherein determining the information regarding the parameter comprises determining a channel condition of the PLC channel based on received information regarding a transmitter output power.

5. The method of claim 1, wherein determining the information regarding the parameter comprises determining a channel condition of the PLC channel based on received information regarding impedance matching with the powerline.

6. The method of claim 1, comprising setting the power consumption of the analog front end such that noise and distortion caused by the analog front end are adapted to noise from the PLC channel.

7. The method of claim 6, comprising computing the noise from the PLC channel as a function of a measured signal to noise ratio (SNR).

8. The method of claim 6, comprising computing the noise from the PLC channel as a function of tonemap and coding rate.

9. The method of claim 1, comprising setting the power consumption of the analog front end such that noise and distortion caused by the analog front end are adapted to a target noise required for particular performance criteria.

10. The method of claim 9, comprising determining the particular performance criteria based on requirements of an application.

11. A system comprising:
    a power line; and
    a transceiver comprising an analog front end coupled with the power line;
    wherein the transceiver is configured to:
    determine information regarding a parameter to be used with powerline communications (PLC) over the power line;

adjust a control parameter of the analog front end based on the determined information to adjust power consumption of the analog front end; and transmit or receive data over the power line with the adjusted control parameter of the analog front end.

12. The system of claim 11, wherein the transceiver is configured to:

determine additional information regarding the parameter to be used;

re-adjust the control parameter of the analog front end based on the additional information to re-adjust power consumption of the analog front end; and transmit or receive data over the power line with the re-adjusted control parameter of the analog front end.

13. The system of claim 11, wherein the transceiver is configured to determine the information regarding the parameter by:

determining a PLC channel condition; and determining a related performance parameter required by an application or a network.

14. The system of claim 11, wherein the transceiver is configured to determine the information regarding the parameter by determining a PLC channel condition based on received information regarding a transmitter output power.

15. The system of claim 11, wherein the transceiver is configured to determine the information regarding the parameter by determining a PLC channel condition based on received information regarding impedance matching with the power line.

16. The system of claim 11, wherein the transceiver is configured to set the power consumption of the analog front end such that noise and distortion caused by the analog front end are adapted to noise from the PLC over the power line.

17. The system of claim 16, wherein the transceiver is configured to compute the noise from the PLC over the power line as a function of a measured signal to noise ratio (SNR).

18. The system of claim 16, wherein the transceiver is configured to compute the noise from the PLC over the power line as a function of tonemap and coding rate.

19. The system of claim 11, wherein the transceiver is configured to set the power consumption of the analog front end such that noise and distortion caused by the analog front end are adapted to a target noise required for particular performance criteria.

20. The system of claim 19, wherein the transceiver is configured to determine the particular performance criteria based on requirements of an application.

* * * * *